(12) United States Patent
Chang

(10) Patent No.: US 6,169,374 B1
(45) Date of Patent: Jan. 2, 2001

(54) ELECTRONIC BALLASTS WITH CURRENT AND VOLTAGE FEEDBACK PATHS

(75) Inventor: Chin Chang, Yorktown Heights, NY (US)

(73) Assignee: Philips Electronics North America Corporation, New York, NY (US)

( * ) Notice: Under 35 U.S.C. 154(b), the term of this patent shall be extended for 0 days.

(21) Appl. No.: 09/455,128

(22) Filed: Dec. 6, 1999

(51) Int. Cl.$^7$ .................................................. H05B 37/02
(52) U.S. Cl. .................. 315/224; 315/291; 315/DIG. 15; 363/34
(58) Field of Search ................................ 315/224, 209 R, 315/219, DIG. 5; 363/34, 40, 37

(56) References Cited

U.S. PATENT DOCUMENTS

| | | | |
|---|---|---|---|
| 5,223,767 | 6/1993 | Kulka | 315/209 |
| 5,313,142 | 5/1994 | Wong | 315/205 |
| 5,387,848 | 2/1995 | Wong | 315/224 |
| 5,400,241 | 3/1995 | Bergervoet | 363/132 |
| 5,459,651 | 10/1995 | Maehara | 363/34 |
| 5,596,247 | 1/1997 | Martich | 315/56 |
| 5,608,295 | 3/1997 | Moisin | 315/247 |
| 5,686,779 | 11/1997 | Moisin et al. | 315/307 |
| 5,764,496 | 6/1998 | Sato et al. | 363/37 |
| 5,771,159 | 6/1998 | Sako et al. | 363/17 |
| 5,798,617 | 8/1998 | Moisin | 315/247 |

FOREIGN PATENT DOCUMENTS

| | | |
|---|---|---|
| 4137207A1 | 5/1993 | (DE) . |
| 0697803A2 | 2/1996 | (EP) . |

OTHER PUBLICATIONS

PHA 23,611, U.S. Serial No. 09/222,904, Filed: Dec. 30, 1998.
PHA 23,618, U.S. Serial No. 09/245,757, Filed: Feb. 8, 1999.

*Primary Examiner*—David Vu
(74) *Attorney, Agent, or Firm*—David R. Treacy

(57) ABSTRACT

A power converter for providing high frequency current to a load such as a fluorescent lamp. A rectifier circuit provides DC power to a half-bridge inverter whose output is connected to one end of a resonant load circuit. One load connection is at the other end of the load circuit, and is connected to one AC-side terminal of the rectifier circuit to provide current feedback. A voltage feedback capacitor is connected between the other AC-side rectifier circuit terminal and the other load connection. The two feedback paths contribute equivalent components to charging current for a bulk capacitor for the DC power to the inverter. Excellent fluorescent lamp ballast performance is obtained with constant inverter frequency, and with either full bridge or voltage doubler embodiments.

17 Claims, 9 Drawing Sheets

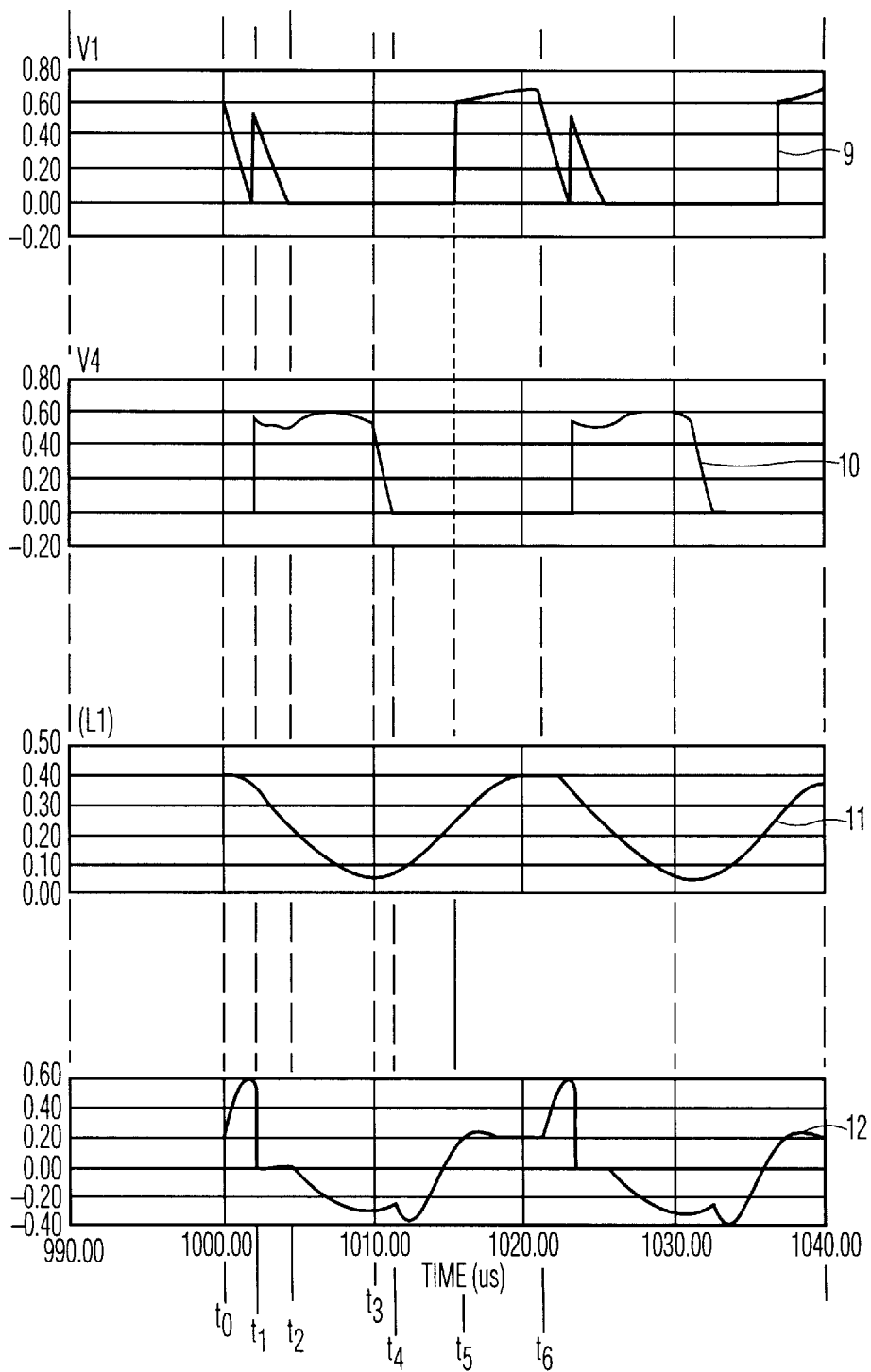

ELECTRONIC BALLASTS WITH CURRENT AND VOLTAGE FEEDBACK PATHS

CROSS-REFERENCE TO RELATED APPLICATIONS

U.S. patent application Ser. No. 09/222,904 filed Dec. 30, 1998 by Jinron Qian for Electronic Lamp Ballast through Line Inductor with Power Feedback to AC-side.

U.S. patent application Ser. No. 09/245,757 filed Feb. 8, 1999 by Jinron Qian and Gert Bruning for Electronic Lamp Ballast with Power Feedback through Line Inductor.

STATEMENT REGARDING FEDERALLY SPONSORED RESEARCH OR DEVELOPMENT

Not Applicable

BACKGROUND OF THE INVENTION

The invention relates to electronic ballasts for operating discharge lamps such as fluorescent lamps, and in particular to such ballasts having a minimum number of active components.

Most magnetically coupled self-oscillating inverters are manufactured in large quantities for sale in a highly competitive market. Half-bridge inverters are widely used because they have a relatively low parts count. A particularly effective type of electronic ballast, or converter, has a load circuit using a resonance inductor or transformer having a linear core, generally together with MOSFET switches (metal oxide silicon field effect transistors). As those of ordinary skill will recognize, in this context a linear core is one in which operation is over a region having a curved B-H characteristic, rather than a sharp B-H characteristic; that is, at all times the flux level is such that a significant increase in magnetizing current will be accompanied by a significant increase in flux level.

U.S. Pat. No. 5,608,295 discloses such a ballast circuit having a resonance inductor in a series connected load circuit between the inverter output and signal ground. The inductor has secondary windings connected to the control terminals of the switching transistors. The load circuit includes a tuning capacitor C8 and the primary winding of a matching transformer. Fluorescent lamps are connected to a secondary winding or windings of the matching transformer, and one or two additional tuning capacitors are connected across the lamps. A feedback conductor is connected between a tap on the primary winding of the matching transformer and a node between two 47 nf feedback capacitors which are connected in series across the AC input to a full wave bridge rectifier circuit. This patent teaches that the low frequency (power line) input current modulates in amplitude the high frequency feedback current which works as a carrier in order to transfer the low frequency input current through the bridge rectifier over most of the low frequency cycle.

BRIEF SUMMARY OF THE INVENTION

An object of the invention is to provide a high frequency electronic converter with superior power factor correction and low cost.

Another object of the invention is to provide electronic lamp ballasts with superior power factor correction and low cost.

A further object of the invention is to reduce current stress in the resonant load circuit of an electronic ballast used to power a fluorescent lamp.

Yet another object of the invention is to provide an electronic ballast which operates efficiently and effectively with a constant inverter frequency.

According to the invention, a high frequency converter circuit including a half-bridge inverter circuit has a voltage source feedback path, including a capacitor, to one terminal at the AC side of the line voltage rectifier circuit, and a current source feedback path to the other terminal at the AC side of the line voltage rectifier circuit. The converter includes two source connection points between which the low frequency line voltage is maintained, and a series inductor between one of these connection points and the rectifier input. The series inductor has an impedance which is not large enough to function as a high frequency blocking inductor; rather, the series inductor carries a substantial high frequency current.

Preferably, the current source feedback is obtained by connecting a resonant load circuit, including a resonance inductor in series with load connection terminals, between the output node of the inverter and the other terminal at the AC side of the line voltage rectifier circuit, with one of the load connection terminals being connected to the AC-side terminal, while the voltage feedback is from the other load connection terminal.

In one preferred embodiment, the converter includes a further high frequency capacitor connected between a first of the AC-side terminals of the line voltage rectifier circuit and one of the DC side terminals. In this embodiment, the load may be a fluorescent lamp, connected directly in series with the resonance inductor or through a matching transformer.

In another preferred embodiment, the load is a fluorescent lamp in parallel with a resonance capacitor. Alternatively, the primary winding of a matching transformer may be in series with the resonance inductor, at least one fluorescent lamp is connected across the secondary of the matching transformer, and the load circuit includes a resonance capacitor.

In yet another preferred embodiment, a small capacitance is connected between the two ac-side terminals of the rectifier. During part of a high frequency cycle this capacitor plays a role in determining the resonant frequency of the resonant load circuit. The resonance capacitor across the lamp is then not needed.

Prior art converters used as fluorescent lamp ballasts have required frequency modulation of the inverter frequency to achieve acceptable lamp crest factor (that is, less than 1.7), line power factor and total harmonic distortion. An important advantage of the invention is that, because both current and voltage feedback are provided, the converter can be operated at a constant switching frequency while still maintaining a low crest factor for the lamp current. At the same time the input line power factor and total harmonic distortion can be held within acceptable limits. Constant switching frequency not only simplifies the inverter control circuitry, but has the further advantage that an EMI filter, required by regulations in most U.S. jurisdictions, can be optimized for that frequency so as to use smaller components.

BRIEF DESCRIPTION OF THE SEVERAL VIEWS OF THE DRAWING

FIGS. 6A–6L are a timing diagram showing voltage and current waveforms of the circuit of FIG. 5, FIGS. 7a–7f are diagrams of the circuit equivalent to FIG. 5 during different intervals of time.

DETAILED DESCRIPTION OF THE INVENTION

Figure 1:
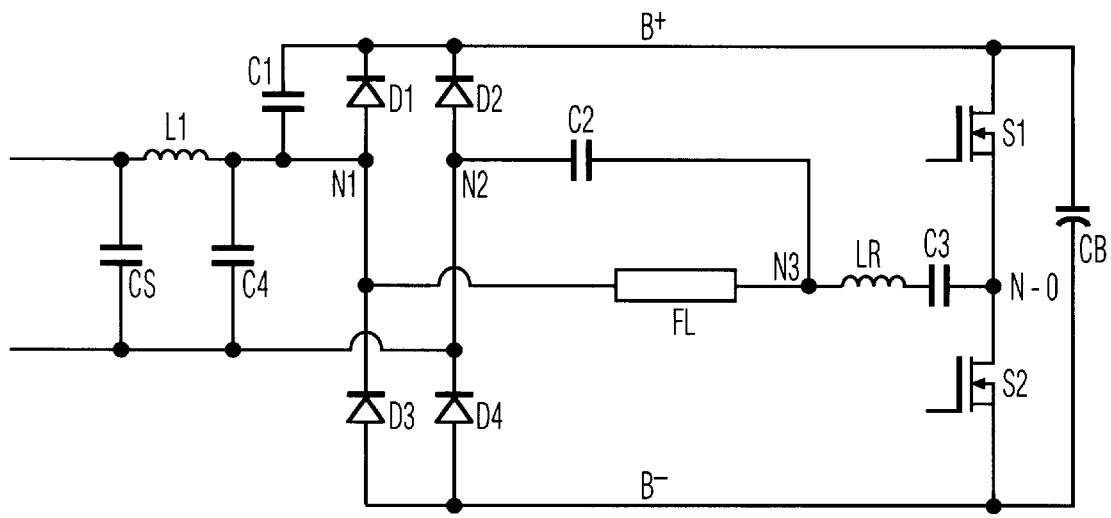
FIG. 1 is a simplified schematic diagram of a converter used as a fluorescent ballast in accordance with the invention, having a balancing circuit between an EMI filter capacitor and the rectifier.

The circuit shown in FIG. 1 combines both the advantages of dual feedback, and a balancing network between an EMI filter and the line voltage rectifier.

The converter includes a conventional half-bridge inverter having two switching transistors S1 and S2 connected in series between a positive bus B$^+$ and a negative bus B$^-$. The voltage between these two buses is maintained smooth by a bulk storage capacitor CB. A full wave rectifier is formed by diodes D1–D4 connected between AC-side terminals and the buses B$^+$ and B$^-$, to provide a high voltage DC source for the converter. To provide correct switching with dual feedback, these diodes must all be fast recovery diodes.

The high frequency circuit has a resonant inductor LR connected in series with the load, a fluorescent lamp FL. To provide current feedback, one lamp terminal is connected directly to the AC-side rectifier terminal at a node N1 between diodes D1 and D2. A high frequency capacitor C1 is connected between that AC-side terminal and the bus B$^+$. A voltage feedback capacitor C2 is connected between a node N3, formed by the other lamp terminal and its connection to inductor LR, and a node N2 which is the other AC-side rectifier terminal. A DC blocking capacitor C3, having a sufficiently high capacitance that only a small high frequency voltage appears across it, is connected between the resonant inductor LR and the inverter output node N-O between the switching transistors S1 and S2.

Between the low frequency AC power line and the rectifier two circuits are connected in series: an EMI filter formed by a line-side shunt capacitor CS, and a balancing network formed by a series inductor L1 and shunt input capacitor C4. The balancing network is a capacitor output low pass circuit having a substantial impedance at the operating frequency or frequency range of the inverter; therefore, the shunt input capacitor has a relatively small capacitance. The resonant frequency is determined primarily by the sum of the capacitances of C2 and C4, multiplied by the inductance LR.

As will be explained below, the balancing network structure and component values are selected such that at operating frequencies of the inverter the charging current components of the current and voltage feedback are equal, and the amount of feedback produces substantially sinusoidal line current. This ensures that, during normal operation, the rectifier circuit does not ever conduct continuously over one full high frequency cycle. In contrast with the balancing network, the EMI filter capacitance is relatively large, so that hardly any high frequency current is conducted over the low frequency power line.

Figure 2:
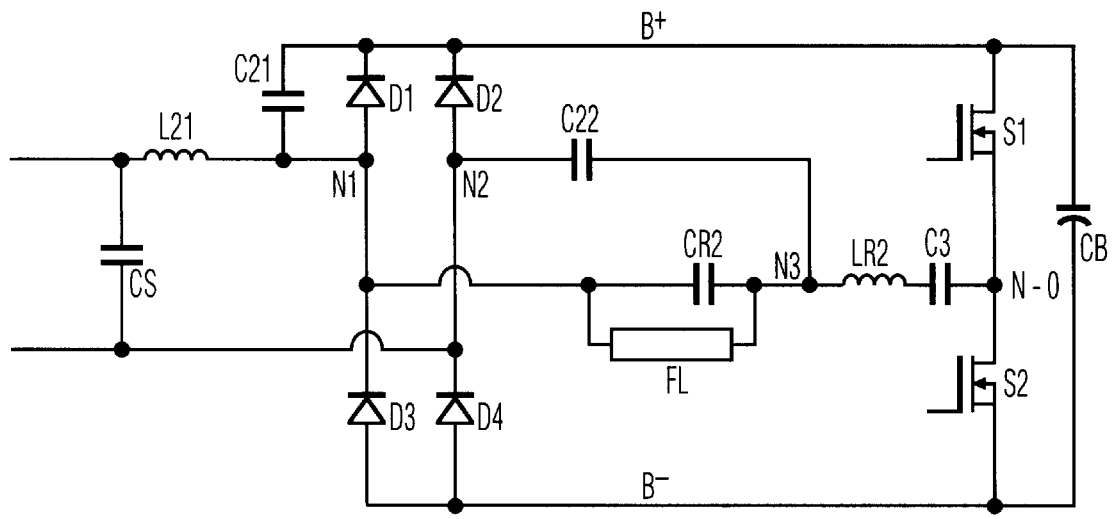
FIG. 2 is a simplified schematic diagram of a variation of the converter of FIG. 1 having a series input inductor, and having a resonance capacitor in parallel with the lamp.

The converter of FIG. 2 is very like that of FIG. 1, except that it does not have a shunt input capacitor directly as part of the balancing network, and instead has a resonant capacitor CR2 across the fluorescent lamp. The EMI filter capacitor would typically be the same as in FIG. 1, but the series input inductor L21 may have a different inductance from that of the balancing inductor L1 of FIG. 1.

The other components have the identical function as in the embodiment of FIG. 1. Because of the different impedance seen by the feedback paths, the optimum values of CR2, C21, C22, and LR2 may differ slightly from the corresponding elements in FIG. 1.

Figure 3:
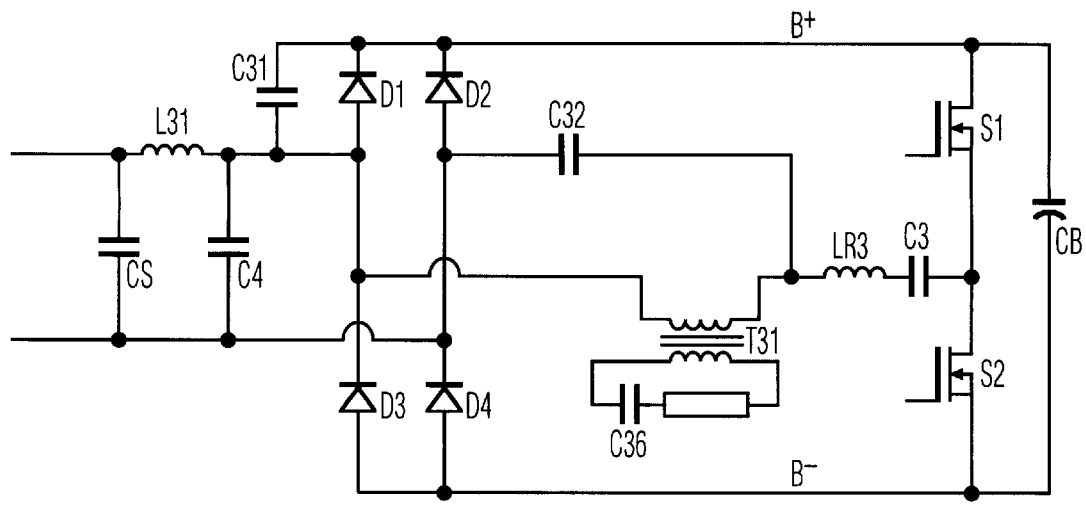
FIG. 3 is a simplified schematic diagram of an embodiment having a matching output transformer permitting operation with multiple lamps.
Figure 4A:
FIG. 4 is a timing diagram showing the effects of relative variation of the amounts of current and voltage feedback.
Figure 4B:
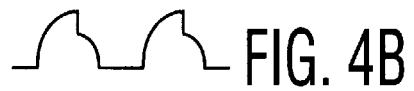
Figure 4C:

The converter of FIG. 3 operates like that of FIG. 1, except that the addition of a matching transformer T31 allows use of lamps with different voltage ratings, and operation with multiple lamps. In this embodiment the matching transformer T1 is a step-up transformer, whose secondary winding is connected to the lamp FL1 through a series capacitor C36 which has a very low capacitance. As a result, when there is no lamp current the voltage developed across the terminals of the lamp FL1 is a few times the normal lamp operating voltage, and this causes the lamp to ignite without use of a typical lamp starting circuit. Further, if two or more lamps are connected in parallel, each with its own series capacitor C36, there is no need for a special circuit which will ensure starting of a second or third lamp after the first one has struck an arc and is drawing a somewhat normal current. All the other components are similar to those of the embodiment of FIG. 1, except that their values will be slightly different The operation of all three embodiments is basically similar. FIG. 4 shows the effect of variation in the balancing circuit values, which can cause the effect of the current feedback to predominate (curve a), or the voltage feedback to predominate (curve b), or the two components to be equivalent (curve c). Thus it will be seen that the two feedback circuits do not have a simple additive effect; rather, they conduct current at different times in the high frequency cycle. When only one feedback is present, the total amount of energy transferred to the bulk capacitor is concentrated in a brief pulse, so that the current through the switches and the resonant inductor must be large. When the dual feedback paths are balanced, charging current is distributed over a maximum period of time, so that current through the switches and resonant inductor is a minimum.

In the circuit of FIG. 3, the ratio of C31 to C34 affects the balance between voltage and current feedback. L31 is effectively in parallel with C34. If the value of L31 is increased, then the value of C34 must be decreased, and voltage feedback would be reduced. If the total amount of feedback is correct, the line current is quite sinusoidal; if feedback is excessive, the line current becomes distorted toward a square wave, while too little feedback causes the current to be concentrated at the peaks of the line voltage.

A circuit according to FIG. 3 was simulated with the following values, and provided a highly sinusoidal line current, together with minimum current through the switches. These values simulated a 100 watt load for a 4 lamp converter operated from a 220 volt line. The inverter frequency was 47 kHz, with each switch on for half of the high frequency cycle.

| | | | |
|---|---|---|---|
| CB | 68 μf | LR3 | 0.93 mH |
| C3 | 0.22 μf | L31 | 2.1 mH |
| C31 | .01 μf | FL | 230 Ω (resistive simulation) |
| C32 | .0082 μf | | |
| C34 | .01 μf | | |

Figure 5:
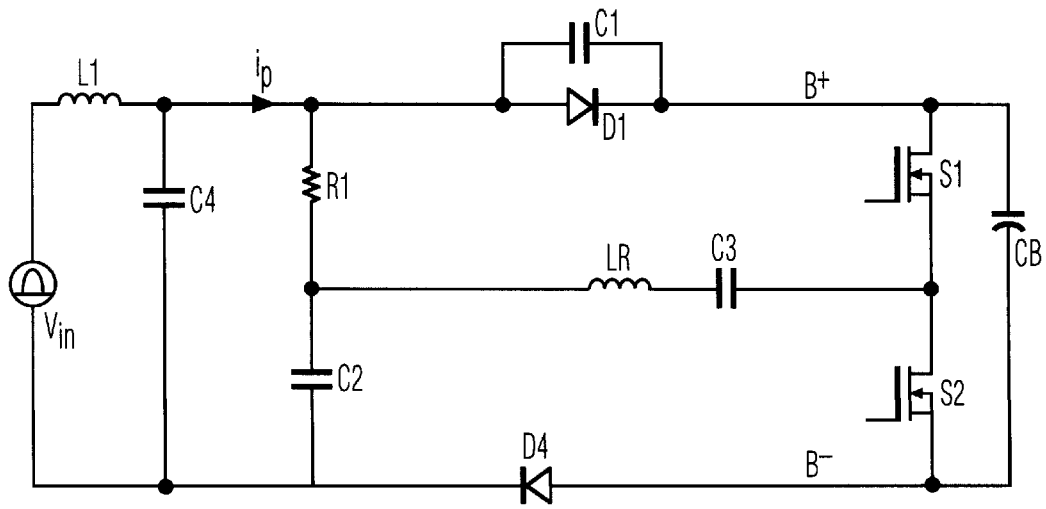
FIG. 5 is an equivalent circuit of the embodiment of FIG. 1 when the line voltage is positive.
Figure 6A:
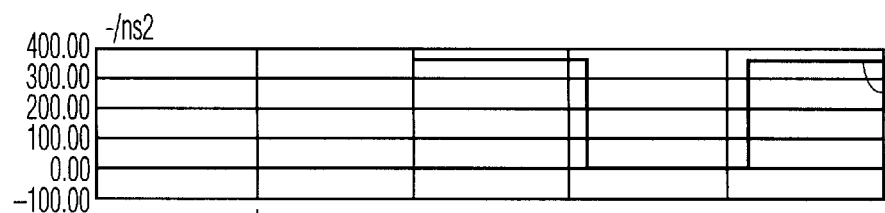
Figure 6B:
Figure 6C:
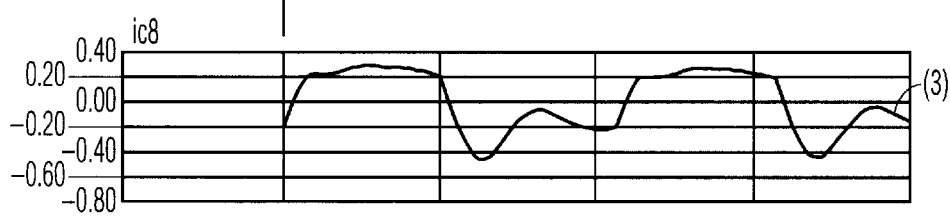
Figure 6D:
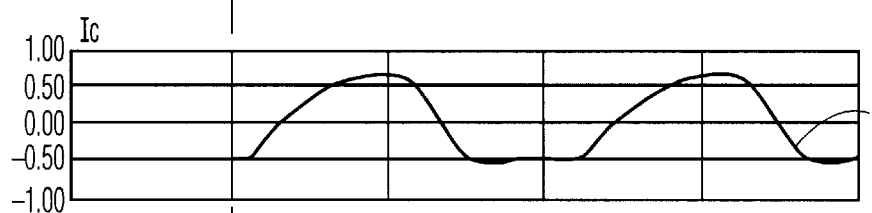
Figure 6E:
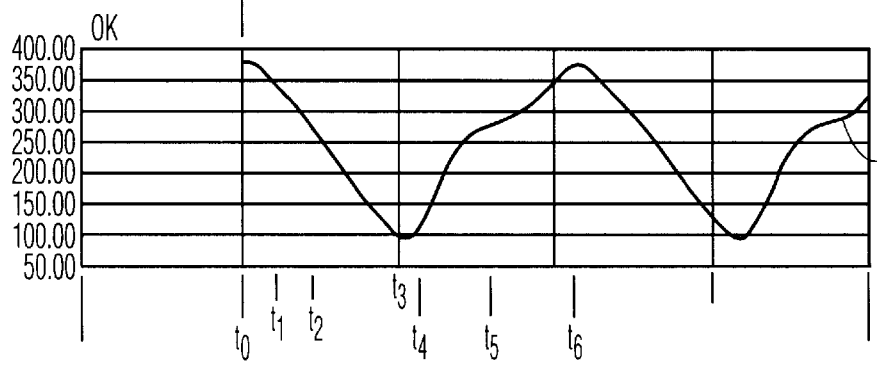
Figure 6F:
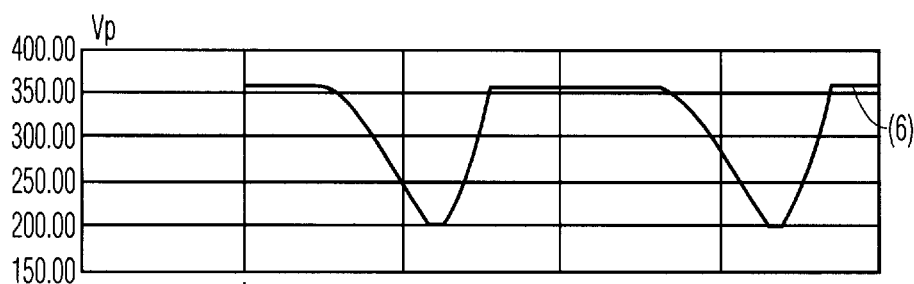
Figure 6G:
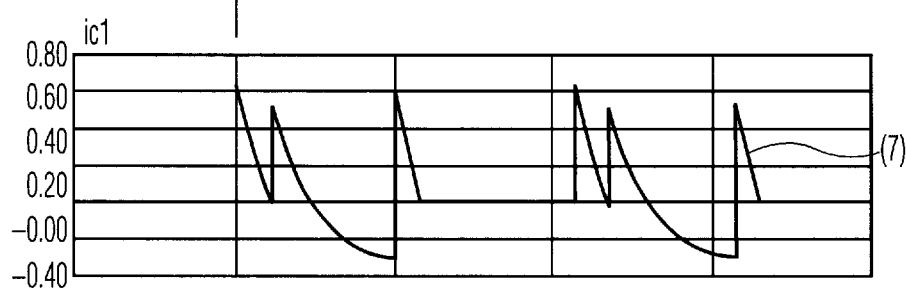
Figure 6H:
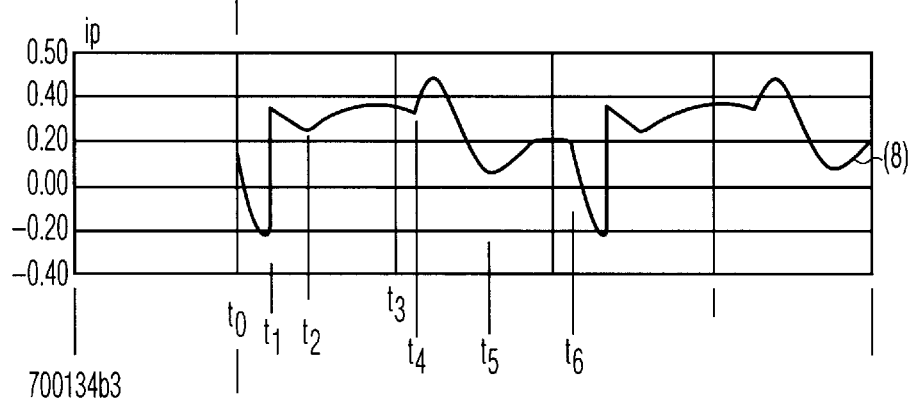

The circuit of FIG. 5 is equivalent to that of FIG. 1 during the half of the low frequency line cycle that is positive, when diodes D1 and D4 would normally be turned on during part of the cycle. The lamp is represented by a resistance R1. Because the line frequency, such as 60 Hz, is much lower than the circuit switching frequency, such as 47 kHz, the input line voltage $v_{in}$ is assumed to be constant during a high frequency cycle. It is also assumed that ripple voltage on the DC bus can be ignored because of the large capacitance CB. Then it is possible to divide one high frequency cycle into a plurality of intervals having corresponding topological circuits determined by the switching on or off of the diodes and the inverter switches. The timing curves of FIGS. 6A–6L show these effects:

| | |
|---|---|
| Curve (1) | Voltage across switch S2 |
| Curve (2) | $i_{LR}$, resonant inductor LR current |
| Curve (3) | Capacitor C2 current |
| Curve (4) | $i_o$, lamp or load current |
| Curve (5) | Voltage across capacitor C2 |
| Curve (6) | $v_p$, the voltage across C4 |
| Curve (7) | $i_{CB}$, bulk capacitor CB current |
| Curve (8) | $i_p$, the current from the input node |
| Curve (9) | $i_{D1}$, diode D1 current |
| Curve (10) | Diode D4 current |
| Curve (11) | $i_{in}$, the input line current |
| Curve (12) | Capacitor C4 current |

The corresponding topological circuits are shown in FIGS. 7a–7f respectively, for the time when line voltage is at 80% of its peak, and correspond to time intervals $t_j$, $t_{(j+1)}$ where j=0, . . . 5.

Interval 1

Figure 7A:
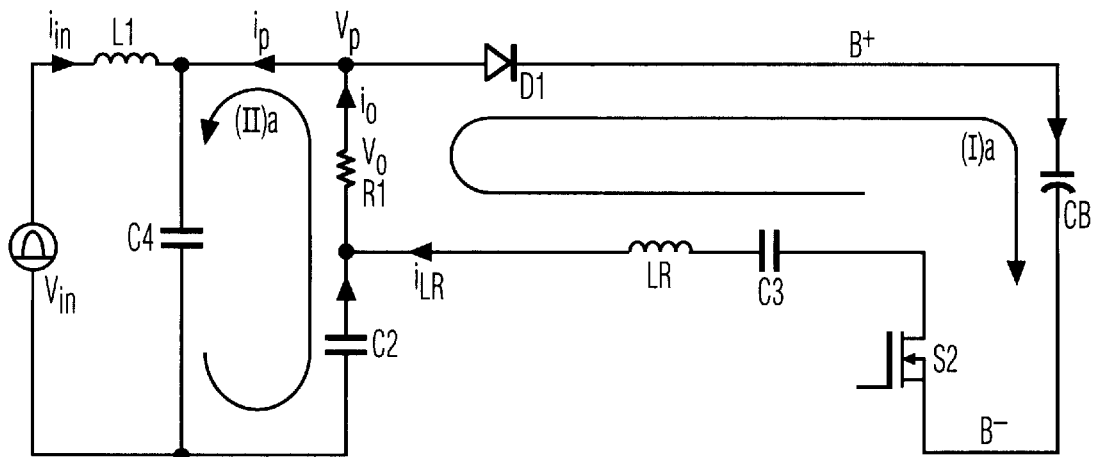
Figure 7B:
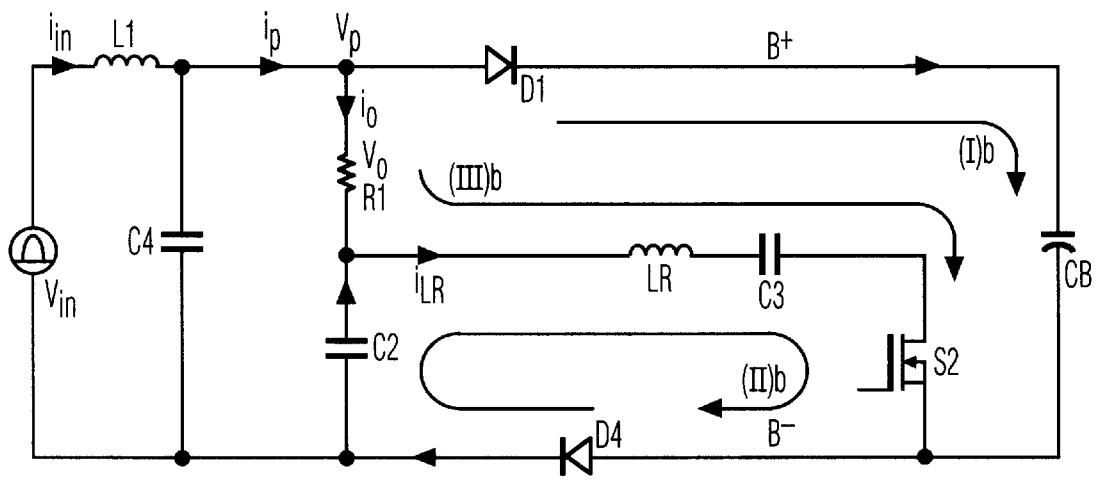
Figure 7C:
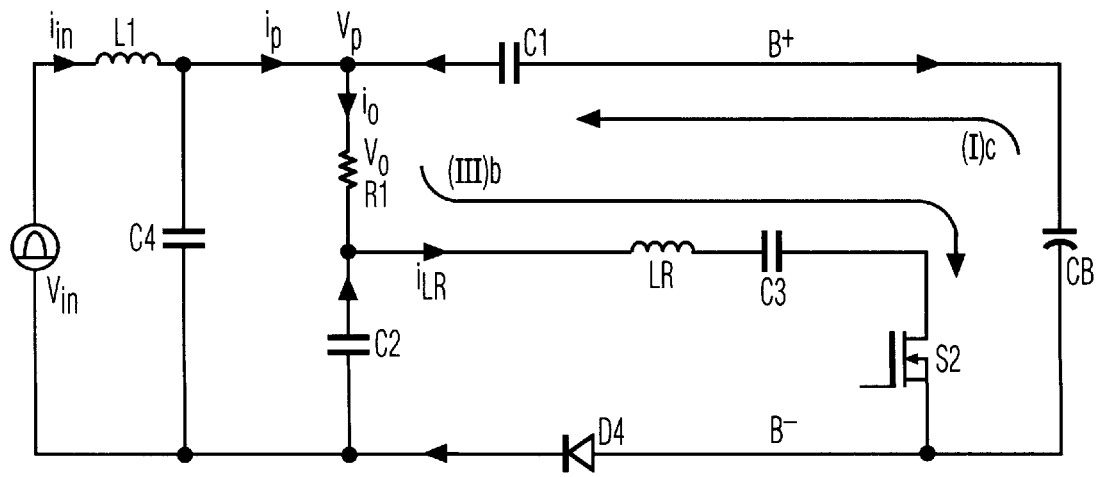
Figure 7D:
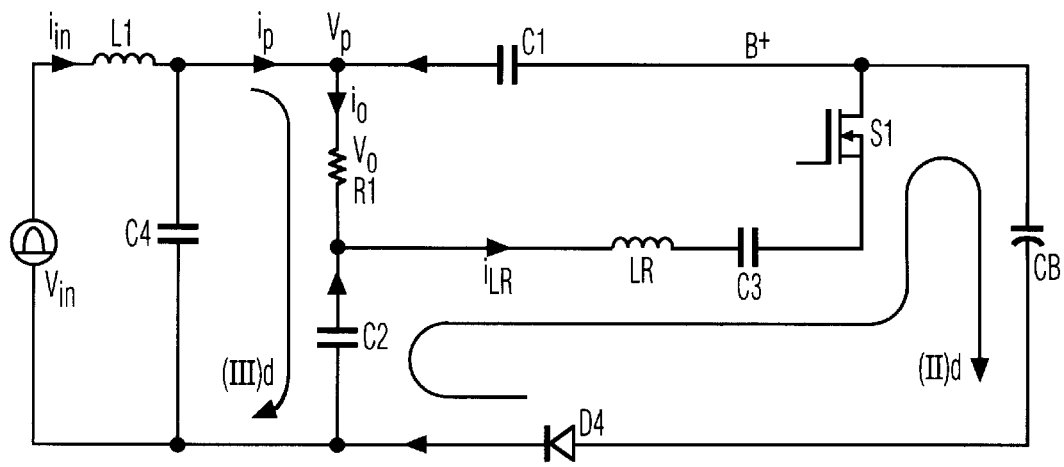

Before $t_0$, D1 is conducting and D4 is off, switch (transistor) S1 is on and switch S2 is off. At $t_0$, switch S1 turns off and S2 turns on as shown in FIG. 7a. The resonant tank current $i_{LR}$ which was circulating in the loop (I)f (FIG. 7f) formed by C3-LR-R1-D1-S1 is diverted to a new loop (I)a formed by C3-LR-R1-D1-CB-S2. During this interval all the energy in resonant inductor LR is transferred to the load R1 and the bulk capacitor CB. At the same time, capacitor C2 is discharged from its peak voltage through a loop (II)a including load R1 and shunt input capacitor C4, thereby adding charge to C4, while the line current $i_{in}$ through L1 is falling from its peak value. This stage continues until $i_{LR}$ has dropped to zero at time $t_1$.

Interval 2

At $t_1$, as the current $i_{LR}$ starts to rise in the opposite direction in loop (II)b, D4 starts to conduct, and capacitor C2 continues discharging. The load current $i_o$ also reverses direction. Current $i_p$ has two components: the load current $i_o$ which flows in loop (III)b through R1, and a direct charging current $i_{CB}$ flowing into bulk capacitor CB via loop (I)b. As load current $i_o$ increases, the current $i_{D1}$ through diode D1 drops, while the line current $i_{in}$ continues to fall. When $i_{D1}$=0, D1 turns off and interval 2 ends.

Interval 3

When D1 turns off at $t_2$, C2 continues to discharge, and the voltage $v_p$ continuously drops below $V_{CB}$, the voltage across the bulk capacitor. As a result, C1 charges via a path (I)c through bulk capacitor CB and capacitor C1, while the inductor current $i_{LR}$ and the load current $i_o$ in path (III)b increase. During this interval the current $i_p$, which is rising slowly, directly contributes to the load current $i_o$, while the line current $i_{in}$ through L1 falls to its lowest value.

Interval 4

At $t_3$ switch S2 is turned off. The resonant inductor current $i_{LR}$ continues to flow, but now in a loop (II)d through the body diode of switch (transistor) S1. The current $i_{LR}$ is continually decreasing while it discharges C2 and charges the bulk capacitor CB. At the same time the line current $i_{in}$ through L1 starts to increase. During this interval the voltage across C2 reaches its minimum, and thereafter C2 starts being charged via a loop III(d) through the load R1 and the input circuit which includes the capacitor C4. Before the voltage $v_p$ across C4 reaches its minimum, capacitor C1 is still continuously charged. When the resonant inductor current $i_{LR}$ reaches zero at $t_4$, D4 turns off, ending interval 4.

Interval 5

Figure 7E:
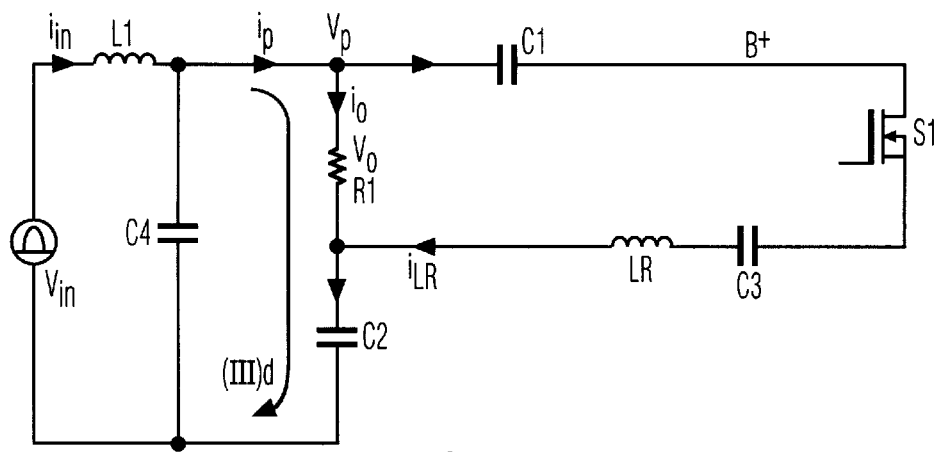
Figure 7F:
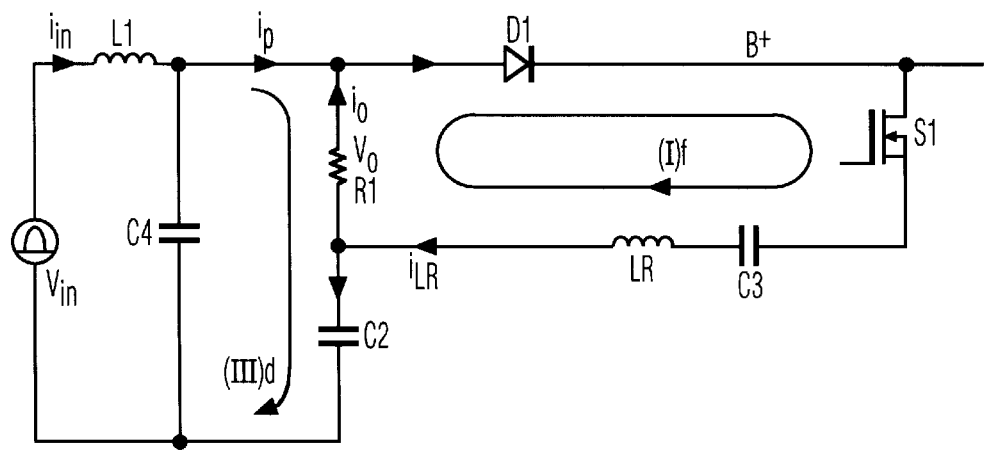

As shown by FIG. 7e, during this interval capacitor C2 is charged by the current $i_p$. At the same time loop C1-C3-LR-R1-S1 forms a series resonant sub-circuit in which resonant inductor current $i_{LR}$ increases in the negative direction while C1 discharges until the voltage across it reaches zero at $t_5$. When the voltage across C1 tends to reverse, diode D1 starts conducting, and interval 6 commences.

Interval 6

Loop D1-S1-C3-LR-R1 form a resonant sub-circuit, in which some of the energy stored in C3 is transferred to the load R1. Resonant inductor current $i_{LR}$ increases slowly to its maximum negative value. At the same time, toward the end of this interval C2 becomes charged to its peak value. At $t_6$ S1 is turned off, thereby starting the next high frequency cycle.

It will be clear to those of ordinary skill that, at other instants in the low frequency line voltage cycle, the durations of the intervals, and even the number of intervals, may change. However, the basic principles for the circuit are not affected.

Voltage Doubler Embodiment

Figure 8:
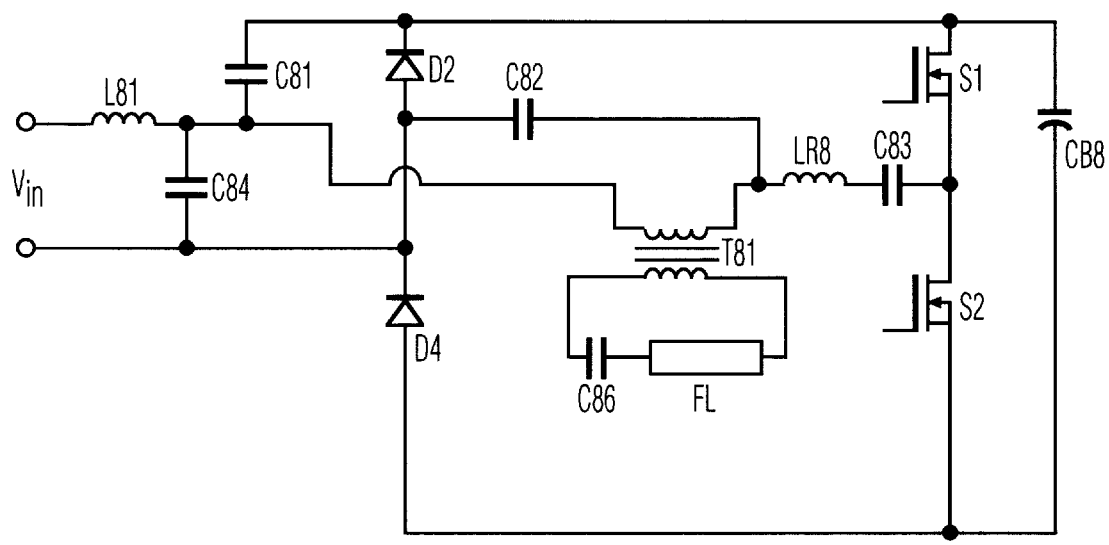
FIG. 8 is a schematic diagram of a converter in accordance with the invention, having a voltage doubler circuit.
Figure 9A:
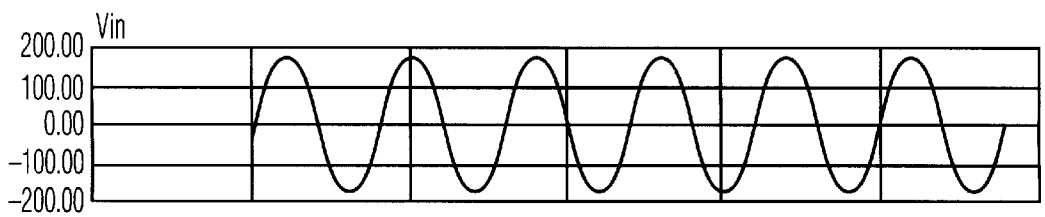
FIG. 9 is a diagram showing the variations in line current, lamp current and DC bus voltage for the circuit of FIG. 8 over a high frequency cycle.
Figure 9B:
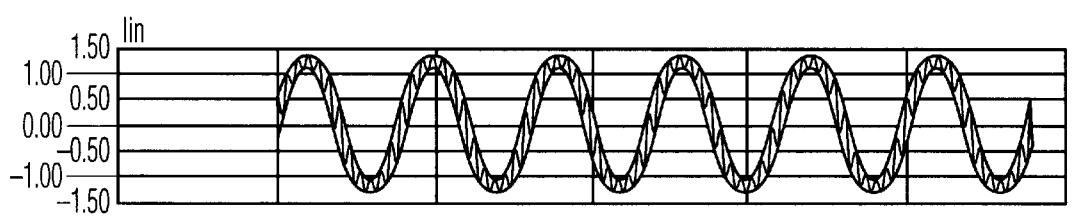
Figure 9C:
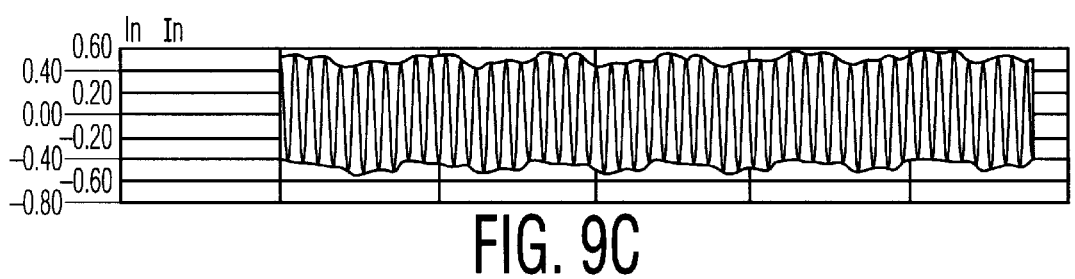
Figure 9D:
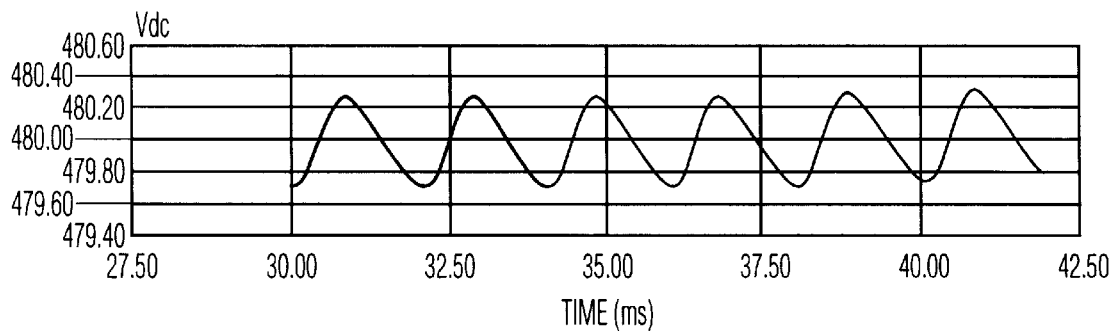

The same principles providing superior performance in a bridge rectifier converter can be applied to a voltage doubler converter. The circuit of FIG. 8 shows a converter which has a reduced parts count as compared with the bridge rectifier, but operates quite similarly. Those of ordinary skill will recognize that, for a given input line voltage, the doubler circuit provides twice the DC bus voltage, so that the voltage ratings of many of the components must be doubled also. This higher voltage usually provides a benefit of ensuring lamp starting and proper operating voltage. Where, as shown in FIG. 8 and frequently required for safety reasons, the lamp is coupled to the converter through transformer T81, this benefit is not available.

A circuit was simulated according to FIG. 8, using the following component values:

| | | | | |
|---|---|---|---|---|
| CB8 | 68 µf | LR8 | 0.93 mH | |
| C83 | 1.0 µf | L81 | 2.1 mH | |
| C81 | 18 µf | FL | 800 Ω (resistive simulation) | |
| C82 | .021 µf | | | |
| C84 | .01 µf | | | |

This simulation produced line and lamp currents as shown in FIG. 9. It can be seen that the current through L81 has a highly sinusoidal envelope, and contains about 0.5 amp peak-to-peak high frequency current which would be filtered out by an EMI capacitor. The lamp current also has an almost constant peak-to-peak value, although over the course of a line cycle there is a variation due to low frequency currents. The DC bus voltage is nearly constant, varying over a range of about 0.1%.

It will be clear to those of ordinary skill in the art that many other variations of these circuits are possible within the scope of the invention. For example, the load may be a completely different kind of device. Operation with other line or inverter frequencies is possible, and variation of inverter frequency may be desirable for load voltage control or lamp dimming, or operation with fewer than the designed number of lamps.

What is claimed is:

1. A low frequency to high frequency power converter comprising:
   a source of low frequency line voltage, having two source connection points between which the low frequency line voltage is maintained,
   a DC supply circuit having at least two diodes and four terminals, two of said terminals being AC-side terminals, and two of said terminals being DC-side terminals, one of said diodes being connected between one of the AC-side terminals and one of the DC-side terminals,
   an input inductor connected in series between one of said source connection points and a first of said AC-side terminals, the second of said AC-side terminals being connected to the other of said source connection points,
   a half-bridge inverter connected to receive DC voltage from said DC-side terminals, said inverter comprising two switches connected in series and having an output node between said switches for providing a high frequency voltage,
   a load circuit carrying a first high frequency current and having an end connected to said output node, said load circuit comprising two connection points for a load, and
   a high frequency power feedback circuit, said feedback circuit including a connection to said load circuit,
   characterized in that said power feedback circuit is a current feedback circuit, one of said two connection points for a load is another end of said load circuit, and said connection to said load circuit is connection of said another end of the load circuit to a first node which is one of said AC-side terminals, and
   said converter further comprises a voltage feedback circuit including a feedback capacitor connected between the other of said two connection points for a load and a second node which is the other of said AC-side terminals.

2. A converter as claimed in claim 1, characterized in that a first high frequency capacitor is connected between the first of said AC-side terminals and one of the DC-side terminals.

3. A converter as claimed in claim 2, characterized in that the converter further comprises an input shunt capacitance across said AC-side terminals, the input shunt capacitance having a value selected to carry switching current associated with switching of at least one of said diodes.

4. A converter as claimed in claim 2, characterized in that the load circuit is a resonant load circuit including a resonance inductor, and the converter includes an additional high frequency capacitor forming part of a resonant circuit with said resonance inductor.

5. A converter as claimed in claim 1, wherein said connection points for a load are connection points for a fluorescent lamp load, said load circuit further comprises a resonance inductor, and the converter comprises at least one capacitor forming part of a resonant circuit with said resonance inductor.

6. A converter as claimed in claim 5, characterized in that said converter comprises an additional high frequency capacitor connected between one of said AC-side terminals and one of the DC-side terminals.

7. A converter as claimed in claim 5, characterized in that the converter further comprises a matching transformer having a primary winding connected to said connection points for a load, and a secondary winding to which is connected a high frequency capacitor in series with a fluorescent lamp.

8. A converter as claimed in claim 5, characterized in that said at least one capacitor is an input shunt capacitance across said AC-side terminals, the input shunt capacitance having a value selected to carry switching current associated with switching of at least one of said diodes.

9. A converter as claimed in claim 8, characterized in that said converter comprises an additional high frequency capacitor connected between one of said AC-side terminals and one of the DC-side terminals.

10. A converter as claimed in claim 9, characterized in that the converter further comprises a bulk capacitor connected to the DC-side terminals, and
    the values of the input inductor, the input shunt capacitance, the additional high frequency capacitor, and the feedback capacitor are selected such that the voltage feedback path and the current feedback path contribute substantially equal components to a charging current pulse for the bulk capacitor.

11. A converter as claimed in claim 9, characterized in that said DC supply circuit is a full wave bridge rectifier, said converter further comprising an EMI filter capacitor connected across said source connection points.

12. A converter as claimed in claim 9, characterized in that said DC supply circuit is a voltage doubler circuit having two said diodes, said second node is a junction between said diodes, and the one of said AC-side terminals to which said additional high frequency capacitor is connected is the first node.

13. A converter as claimed in claim 5, characterized in that said at least one capacitor is connected in parallel with said two connection points for a load.

14. A converter as claimed in claim 13, characterized in that said converter comprises an additional high frequency capacitor connected between one of said AC-side terminals and one of the DC-side terminals.

15. A converter as claimed in claim 14, characterized in that the converter further comprises a bulk capacitor connected to the DC-side terminals, and
    the values of the input inductor, the additional high frequency capacitor, the capacitor connected in parallel with said two connection points for a load, and the feedback capacitor are selected such that the voltage feedback path and the current feedback path contribute substantially equal components to a charging current pulse for the bulk capacitor.

16. A converter as claimed in claim 15, characterized in that said DC supply circuit is a full wave bridge rectifier, said converter further comprising an EMI filter capacitor connected across said source connection points.

17. A converter as claimed in claim 15, said DC supply circuit is a voltage doubler circuit having two said diodes, said second node is a junction between said diodes, and the one of said AC-side terminals to which said additional high frequency capacitor is connected is the first node.

\* \* \* \* \*